United States Patent [19]

Lopez

[11] Patent Number: 5,419,945
[45] Date of Patent: May 30, 1995

[54] SIMULATED MECHANIC'S CREEPER AND OIL AND GREASE DRIP CATCHING MAT

[76] Inventor: Gabriel A. Lopez, 144 W. Las Flores, Arcadia, Calif. 91006

[21] Appl. No.: 976,580

[22] Filed: Nov. 16, 1992

[51] Int. Cl.⁶ .................. B32B 1/00; B62D 27/00
[52] U.S. Cl. .................. 428/178; 428/73; 428/155; 428/172; 428/182; 428/187; 428/212; 296/38; 184/106
[58] Field of Search ............. 296/38, 97.23; 428/178, 428/182, 212, 73, 75, 76, 155, 156, 167, 187, 195, 207; 15/215, 216, 238; 5/417; 184/106

[56] References Cited

U.S. PATENT DOCUMENTS

| | | | |
|---|---|---|---|
| 1,630,639 | 5/1927 | Taylor | 184/106 |
| 1,764,756 | 6/1930 | Slee | 184/106 |
| 2,833,375 | 5/1958 | Lundelius | 184/106 |
| 2,986,235 | 5/1961 | Weibert, Jr. | 184/106 |
| 2,996,150 | 8/1961 | Cassem | 184/106 |
| 3,228,491 | 1/1966 | Gatsos | 184/106 |
| 3,834,527 | 9/1974 | Howe | 184/106 |
| 4,671,024 | 6/1987 | Schumacher | 52/2 |
| 4,684,562 | 8/1987 | Hartkemeyer | 428/182 |
| 4,798,754 | 1/1989 | Tomek | 428/74 |
| 4,801,005 | 1/1989 | Hahn et al. | 141/28 |
| 4,926,512 | 5/1990 | Coyle | 5/417 |
| 5,000,341 | 3/1991 | Shirota | 220/452 |

*Primary Examiner*—Donald J. Loney
*Attorney, Agent, or Firm*—Benoit Law Corporation

[57] ABSTRACT

A method of simulating a creeper for mechanics servicing a vehicle spaced from a floor and for catching vehicle drippings provides a sheet of cellular material with a lower surface for contacting the floor therealong and with a parallel upper surface. That method and simulated creepers provide for a catching of vehicle drippings and avoid a need for creeper casters by coating the upper surface of that sheet with a dripping-impervious layer facing the vehicle having a lower surface friction than the cellular sheet at its lower surface so that a mechanic may slide along the surface of that layer while the lower surface remains stationary on the floor. An assembly of combined simulated creepers for mechanics servicing a vehicle spaced from a floor and mat for catching vehicle drippings comprises a display box and sheets of cellular material in that box each having a lower floor-contacting surface and having a parallel upper surface and on that upper surface a drip-impervious layer having a lower surface friction than the sheets at their lower surface.

29 Claims, 2 Drawing Sheets

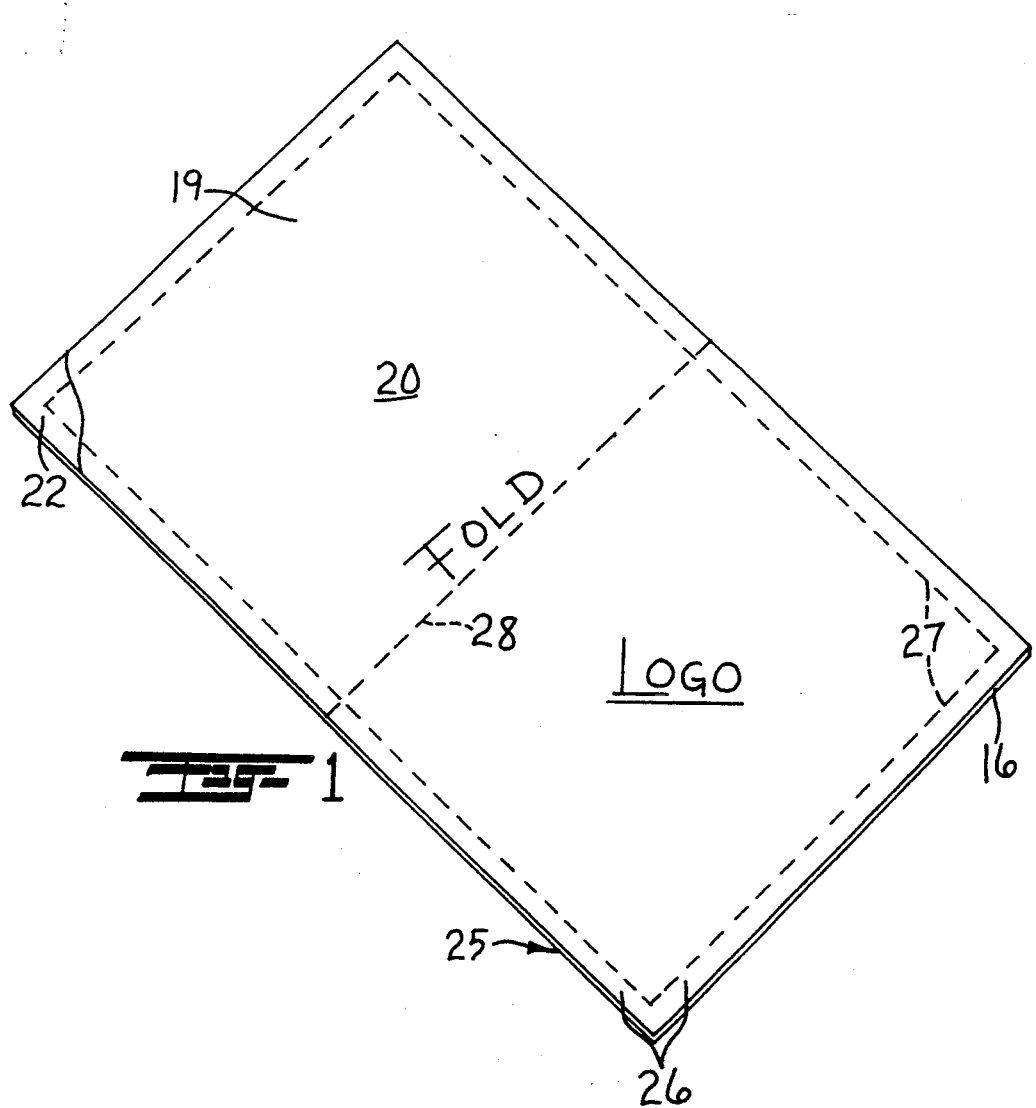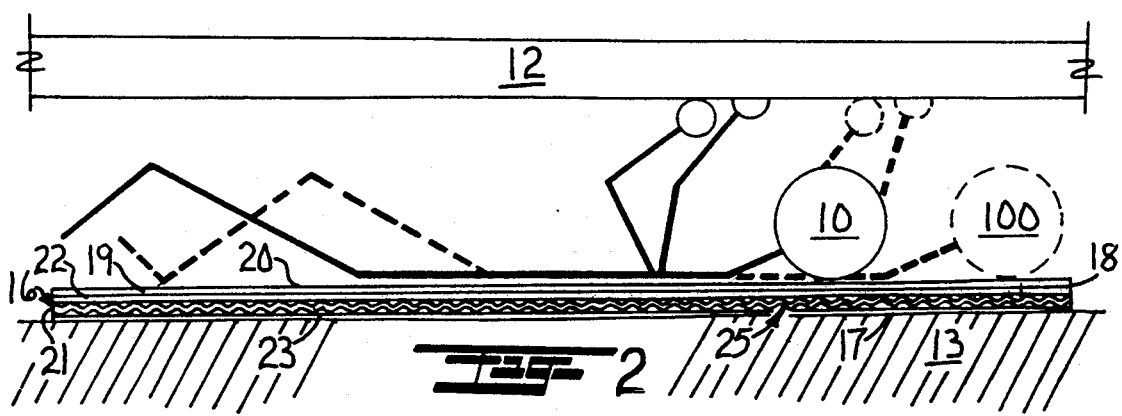

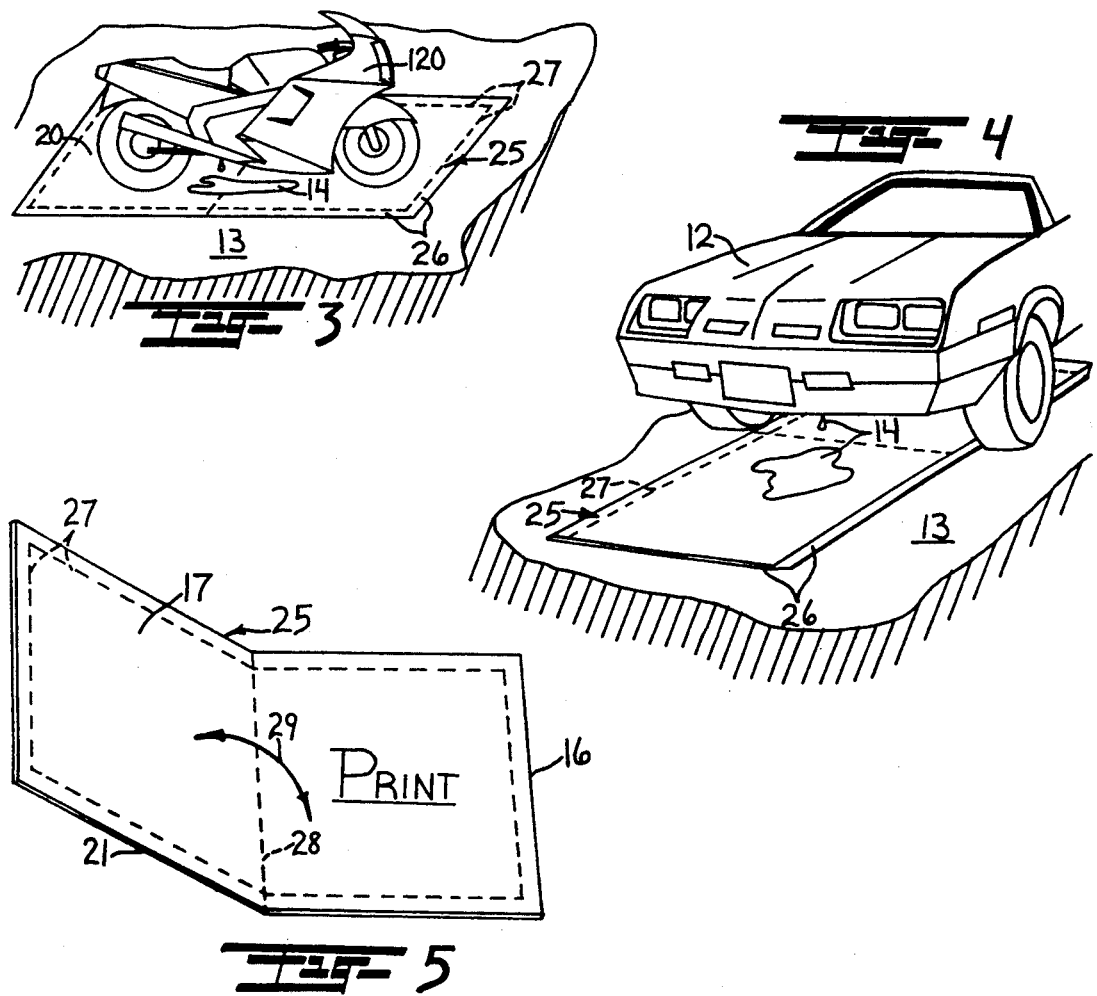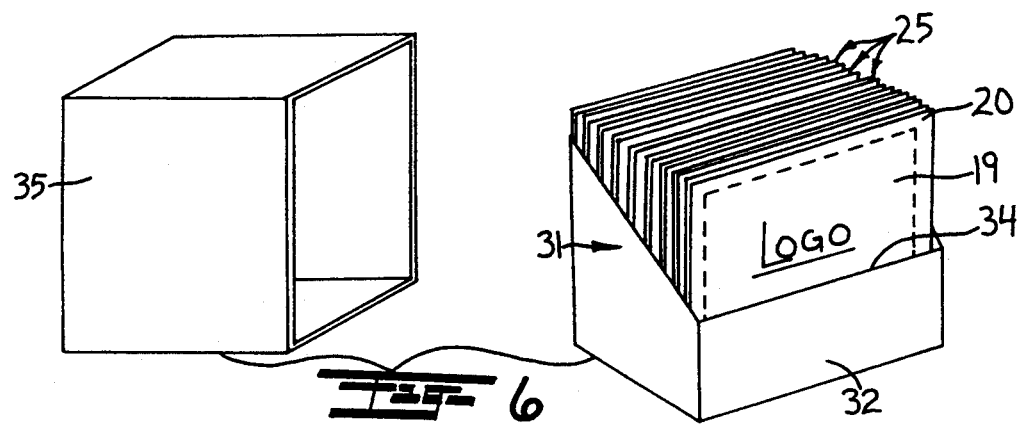

SIMULATED MECHANIC'S CREEPER AND OIL AND GREASE DRIP CATCHING MAT

FIELD OF THE INVENTION

The subject invention relates to simulated mechanic's creepers and to mats for catching vehicle drippings.

BACKGROUND OF THE INVENTION

Creepers for use by repair persons or mechanics are well known. A definition of such creepers is, for instance, found in The Random House Dictionary, Second Edition (1987), as "a flat framework on casters, on which a mechanic lies while working under an automobile or the like."

A casterless creeper is apparent from U.S. Pat. No. 1,764,756, by R. W. Slee, issued Jun. 17, 1930 for "Automobile Creeper." That simulated creeper comprised a broad flat body portion adapted to slide when in use, and a head rest with rigid base extension for engagement by the body of the user to advance the same on the floor. The body portion had a fiber upper deck with upwardly projecting side guards. The structure was built largely of cellular board having corrugations disposed for draining water or oil out of the structure on which it fell.

U.S. Pat. No. 1,630,639, by T. M. Taylor, issued May 31, 1927 disclosed an oil and grease drip sheet formed of paper or similar flexible material covered or saturated with asphalt or the like whereby the same is made waterproof.

U.S. Pat. No. 2,833,375, by G. R. Lundelius, issued May 6, 1958 disclosed a drip pan to be positioned beneath a motor vehicle for catching and retaining lubricants dripping therefrom. That drip pan comprised a rectangular foldable frame including substantially U-shaped half sections terminating in aligned end loops. These half sections comprised depending, substantially U-shaped supporting legs at spaced intermediate points, a flexible panel mounted in the frame, and a supporting rod for that panel extending transversely therebeneath and including substantially U-shaped end portions engaged in the loops for hingedly connecting the half sections and mounting the rod thereon.

U.S. Pat. No. 2,986,235, by B. E. Weibert, issued May 30, 1961, disclosed a garage floor covering and protecting oil drip catcher comprising a shallow pan having a flat bottom and non-absorbent means catching and conducting oil drops into concealed location at the bottom of the pan thus maintaining a clean appearance on top comprising a thin flat pad of matted metal fibers covering and contacting the bottom of the pan.

U.S. Pat. No. 2,996,150, by G. R. Cassem, issued Aug. 15, 1961 disclosed a garage floor liner comprising a pliable base sheet adapted to substantially cover the area of a garage floor. That sheet included side flanges located on a portion of the perimeter thereof. In particular, the side flanges were located at the sides of the sheet and at one end thereof, thereby providing an open end for driving a vehicle onto that liner. A plurality of suction surfaces was provided on the under side of the sheet; the upper side of that sheet including a pair of lengthened trackways. Such trackways included frictional substances therein for imparting a frictional effect to automobile wheels driven on these trackways. The open end of the liner includes a transverse raised boss thereon for the further entrapment of material on that liner.

U.S. Pat. No. 3,228,491, by S. L. Gatsos, issued Jan. 11, 1966 disclosed a drip mat for use beneath an automobile to absorb and hold grease and oil drippings comprising a substantially rectangular body portion of a size adapted to fit beneath an automobile. That body portion was multi-ply and laminated and had a top layer of substantially smooth fibrous material perforated to receive oil and grease drippings for absorption inside the mat structure, an intermediate layer of corrugated fibrous material, a lower layer of imperforate fibrous material and a bottom coating of grease and oil impervious plastics material. That body portion was scored transversely near its longitudinal center to facilitate folding of two half sections thereof upon each other for storage. Printed indicia, advertising, instructions and the like were provided on the upper side. That body portion also had a system of initially flat foldable hinged sections and slits for providing integral supporting feet thereon for spacing the mat from the floor.

U.S. Pat. No. 3,834,527, by G. F. Howe, issued Sep. 10, 1974 disclosed a disposable oil drip pan formed of a stiffened oil-resistant material which included a plurality of interconnected accordion folds. Each of the accordion folds included a pair of side walls and a ridge formed at the intersection of that pair of side walls with each accordion fold being movable between a flattened position with the side walls in contacting relation and an open position with the side walls inclined upwardly toward the ridge.

U.S. Pat. No. 4,671,024, by H. W. Schumacher, issued Jun. 9, 1987 disclosed a drip pan adapted to catch dirt and debris falling from a vehicle that is driven onto it. The drip pan was a rectangular sheet of plastic material sized to extend beyond the perimeter of a vehicle. The edges of the plastic sheet are rolled under and thermally sealed or glued along a line parallel with the perimeter of the sheet, forming a sleeve.

U.S. Pat. No. 4,798,754, by L. S. Tomek, issued Jan. 17, 1989 disclosed a lightweight, disposable absorbent mat adapted for placement beneath a motor vehicle or machine to catch oil, grease and other drippings and comprising a generally rectangular base layer made up of an oil-impervious material, and a plurality of upper, oil-absorbent plies interconnected to one another and superimposed on the base layer; the plies being made up of a highly absorbent paper or cellulose material. The plies of paper material were interconnected at spaced intervals and covered with an upper plastic layer perforated to permit any drippings to pass through the upper layer into the absorbent plies; the upper layer having an outer peripheral edge or edges sealed to the outer peripheral edges of the bottom layer to form a moisture barrier around the sides of the absorbent plies. Stiffener frame members were interposed between the outer peripheral edges of the upper and base layers.

U.S. Pat. No. 4,801,005, by A. Hahn et al., issued Jan. 31, 1989 disclosed a mat designed to absorb a maximum amount of oil, keep the oil from seeping onto floors or work areas, be laid flat on floors or work areas, be unfolded during removal from containers, and folded to be repackaged in the original container. The mat structure which incorporated mineral based absorbents, was pleated, and had an underside composed of a material that was oil and abrasion resistant.

U.S. Pat. No. 5,000,341, by K. Shirota, issued Mar. 19, 1991 disclosed a container for the storage and disposal of liquids, such as liquid fats, oils and suspended greases, comprising a receptacle with interior walls impervious and resistant to such liquids. One or more thick mats were contained within such receptacle. Such mats were comprised of pads of absorbent material, such as paper or other fibrous or filamentary pulp products, laminated and bonded onto a thin oil-absorbent sheet made from a material such as paper and non-woven fabric.

In a different vein, U.S. Pat. No. 4,926,512, by B. D. Coyle, issued May 22, 1990 disclosed a folding paperboard beach chair formed from a single scored blank of paperboard. The elongated paperboard body had two spaced-apart and transverse score lines defining a bottom leg support panel, a middle seat support panel, and a top back support panel wherein the bottom and top panels are adapted to be folded so as to overlay the middle panel.

On the other hand, the conventional type of automotive repair creeper where a board structure is mounted on casters continues to be manufactured and used.

SUMMARY OF THE INVENTION

It is an object of the invention to simulate a creeper for mechanics servicing a vehicle that not only avoids the traditional casters, but also the prior-art "rigid base extension for engagement by the body of the user to advance the same on the floor," and that can also catch vehicle drippings, such as oil and grease drippings, if desired.

It is a germane object of the invention to provide a simulated creeper that can be used on grass, dirt, or other irregular surfaces, as well as regular or concrete surfaces and floors.

It is a related object of the invention to provide a simulated creeper that can be carried aboard a vehicle and can be deployed therefrom in an emergency or otherwise and can be used on road, dirt, grass or other irregular surfaces on or off the road by a person creeping onto or under that vehicle when broken down or stopped.

It is a related object of the invention to provide a combined simulated creeper for mechanics servicing a vehicle spaced from a floor, which can double as a mat for catching vehicle drippings.

Conversely, it is an object of the invention to provide a mat for catching vehicle drippings that can also be used as a simulated creeper for mechanics servicing a vehicle spaced from a floor.

It is a germane object of the invention to provide an assembly of combined simulated creepers for mechanics and vehicle drip catching mats in a display box.

Other objects of the invention will become apparent in the further course of this disclosure.

The invention resides in a method of simulating a creeper for mechanics servicing a vehicle spaced from a floor and for catching vehicle drippings, comprising, in combination, providing a sheet of cellular material with a lower surface for contacting the floor therealong and with a parallel upper surface. The invention provides for a catching of vehicle drippings and avoids a need for creeper casters by coating the upper surface of the sheet of cellular material with a dripping-impervious layer having a lower surface friction than that sheet at its lower surface so that a mechanic may slide along the surface of that layer while the lower surface remains stationary on the floor.

The simulated creeper of the invention thus does not creep on the floor, but enables the mechanic to creep on the creeper easily.

The invention resides also in a combined simulated creeper and mat for mechanics servicing a vehicle spaced from a floor and for catching vehicle drippings, comprising, in combination with the vehicle and the floor, a sheet of cellular material having a lower surface contacting the floor or floor-contacting surface and having a parallel upper surface parallel to that lower or floor-contacting surface, and on that upper surface a drip-impervious layer facing the vehicle and having a lower surface friction than that sheet at that lower floor-contacting surface.

The invention resides also in a combined simulated creeper and mat for mechanics servicing a vehicle spaced from a floor and for catching vehicle drippings, comprising in combination with the vehicle and the floor, a sheet of cellular material having a lower surface contacting the floor and having an upper surface parallel to the lower surface, and on that upper surface a metal foil covering the sheet at the upper surface and facing the vehicle and having a lower surface friction than the sheet at the lower surface.

The invention resides also in a combined simulated creeper and mat for mechanics servicing a vehicle spaced from a floor and for catching vehicle drippings, comprising in combination with the vehicle and the floor, a sheet of corrugated material having a lower surface contacting the floor and having an upper surface parallel to the lower surface, and on that upper surface a drip-impervious layer facing the vehicle and having a lower surface friction than the sheet at the lower surface.

The invention also resides in an assembly of combined simulated creepers for mechanics servicing a vehicle spaced from a floor and mat for catching vehicle drippings, comprising, in combination, a display box and sheets of cellular material in that box each having a lower floor-contacting surface and having a parallel upper surface and on that upper surface a drip-impervious layer having a lower surface friction than the sheets at their lower surface.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 1 is a top view of a composite simulated mechanic's creeper and drip catching mat according to an embodiment of the invention;

FIG. 2 is a side view of the composite simulated creeper and mat on a garage or other floor, with a symbolized showing of a mechanic thereon and parts of a vehicle thereabove;

FIG. 3 is a perspective view of a floor, vehicle and composite simulated creeper and mat shown used as a catcher of drippings, such as oil and grease dripping from the vehicle;

FIG. 4 is a perspective view of a composite simulated creeper and mat with upturned edges or margins for catching larger amounts of drippings from a vehicle;

FIG. 5 is a view of the composite simulated creeper and mat illustrated in the process of folding along a score line; and FIG. 6 is a perspective view of an assembly of combined simulated creepers and mats in a partially opened display box.

DESCRIPTION OF PREFERRED EMBODIMENTS

From one aspect thereof, the drawings illustrate a method of simulating a creeper for mechanics 10 servicing a vehicle 12 spaced from a floor 13 and for catching vehicle drippings 14. That method provides a sheet of cellular material 16 with a lower surface 17 for contacting the floor 13 therealong and with a parallel upper surface 18. That method also provides for a catching of vehicle drippings 14 and for avoiding a need for creeper casters by coating the upper surface 18 of the sheet with a dripping-impervious layer 19 having a lower surface friction than the sheet 16 at its lower surface 17 so that a mechanic 10 may slide along the surface 20 of that layer 19, as shown by dotted lines at 100, while the lower surface remains stationary on the floor 13 due to its higher friction.

In this or any other manner, the invention provides or resides in a combined simulated creeper 21 for mechanics 10 servicing a vehicle 12 spaced from a floor 13 and mat for catching vehicle drippings 14. That combined simulated creeper and mat comprises, in combination with the vehicle 12 and the floor 13, a sheet of cellular material 16 having a lower surface 17 contacting the floor 13, such lower surface being also called floor-contacting surface 17 and having an upper surface 18 parallel to that lower surface 17, and on that upper surface 18 a drip-impervious layer 19 facing the vehicle 12 and having a lower surface friction than the sheet 16 at its lower surface 17.

The intent of "cellular" for the sheet 16 according to the invention is to provide the top coating or layer 19 with a substrate at 16 that is softer than such layer 19, thereby providing the mechanic 10 with a kind of cushion on the hard floor 13. Accordingly, a foam rubber pad and the like at 21 between the top and bottom sheets 22 and 23 of the structure 16 would qualify as "cellular" within the scope of the invention. "Substrate with air or gaseous interstices" would be another way to describe the structure or substrate 16.

Another example is the cellular plastic sheets now frequently seen as advertising signs and for other purposes. According to a preferred embodiment of the invention, FIG. 2 shows corrugations 29 for the cellular sheet 16 which may be corrugated cardboard. The cellular material is thus provided as corrugated material at 16 or 21, 22 and 23, having the lower surface 17 for contacting the floor 13 therealong, and having the parallel upper surface 18 coated with the dripping-impervious layer 19 of lower surface friction at 20.

The method and structure according to the invention avoids the casters of conventional mechanic's creepers. This not only makes unnecessary the casters themselves, but also the framework necessary with a use of casters and the heavy boarding necessary to support a person above ground, if casters were used. In automobile repair shops and other operations where frequent repairs are done, the expense resulting from a use of casters and heavier creeper structures may be justified. However, in less commercial situations, a casterless creeper has the advantage of lower expense, for one thing. In this respect, the expression "mechanic" as herein employed is to be taken broadly to extend to persons that may not necessarily be professional or amateur mechanics in the conventional sense, but that may simply be tending their own vehicle or that of a family member or friend. Since simulated creepers according to the invention may be carried in vehicles and used on or off the road, such as when a vehicle breaks down, the term "mechanic" may also apply to drivers, passengers, roadside assistants and such other persons that will tend a vehicle in an emergency or otherwise on or off the road.

By way of contrast, the above mentioned prior-art "automobile creeper" still had borrowed from conventional caster-type creepers the principle that such creepers are moved by their users along the floor.

Such "automobile creeper" thus had an extension adapted as a means for propelling that casterless creeper on the floor by the user thereon. That, in turn, required that prior-art "automobile creeper" to be provided on its lower surface with a thin layer of tough fiber preferably, although leather, canvas, or metal were suggested as well. In each case, low friction between the underside of that prior-art casterless creeper and the floor was important, if the goal of propelling that creeper without casters by the mechanic was to be realized. At the same time, low friction between the top of that prior-art casterless creeper and the mechanic's clothes had to be avoided, since the mechanic had to move that type of creeper with his or her body. Even then, operation of that prior-art creeper required a smooth floor underneath. Neither the conventional caster-type creeper, nor the above mentioned prior-art caster-less creeper would work on grass, dirt or other irregular surfaces.

Contrary to that prior-art approach, the simulated creeper according to the subject invention provides the lowest friction on the top surface 20 of the composite creeper 25 and makes no effort to reduce the natural friction between the lower creeper surface and the floor. That higher friction at the lower surface 17 may, for instance, be the natural friction between a sheet of cellular material 16 and a concrete floor, grass, dirt or other regular or irregular surface on or off the road 13 on which it rests, or between the lower sheet 23 and such floor 13.

For reduced friction between the mechanic's clothing and the composite casterless creeper 25, the upper surface 18 of the sheet 16 or 22 preferably is coated with a metal foil as the layer 19 having the lower friction on its surface 20 relative to the lower surface 17 of that sheet 16 or composite creeper 25.

Conventional coating, covering or laminating techniques may be used for that purpose, and are herein covered under the term "coating." Alternatives include a layer or coating of a low-friction plastic material which not only is resistant to various chemical agents, but to high temperatures as well. Several such materials are known, with the oldest being Teflon, a familiar trademarked brand of polytetrafluoroethylene.

The casterless creeper according to the invention also has the advantage of being able to serve the catching of drippings 14 from various vehicles 12 and 120 with the layer 19 having the above mentioned lower surface friction. This is just opposite to the approach of the above mentioned prior-art casterless "automobile creeper" which soaks up water and oil falling on that structure from a vehicle. That, incidentally, is the approach of most of the above mentioned composite prior art structure, including Weibert, Gatsos, and Tomek.

Contrary to that prior-art approach, the subject invention catches drippings 14 on the upper surface 20 of the composite structure 21. Such drippings 14 may thus be wiped off and more easily disposed of in an ecologically sound and acceptable manner, than if the structure 16 were soaked with such drippings, such as in Slee, Weibert, Gatsos, and Tomek.

Where larger quantities of drippings, motor oil, and the like are to be collected, edges 26 of the sheet 25 may be upturned, as shown in FIG. 4, for instance.

By way of example, the sheet 16 is provided with marginal score lines 27 enabling upturning of the marginal edges 26. Drippings from various vehicles 12 and 120 may thus be collected with composite sheets according to the invention. In the case of oil changes, the bucket or container receiving the oil for disposal or preferably recycling may be disposed on the composite structure 25.

Alternatively, or additionally, the sheet 16 has a folding score line 28 thereacross, so that the structure 25 with top coating or layer 19 may be folded in half, for instance, such as indicated in FIG. 5 by a double arrow 29.

As indicated by the word "PRINT" or "LOGO" in FIGS. 1 and 6, text may be printed on the upper surface 20 of the coating or layer 19. This enhances the value of the simulated creeper or oil and grease mat. "Text" in this respect includes printing of indicia, instructions, advertising material, logos, designs, pictures, and many other representations. As apparent from the word "LOGO" in FIG. 5, "text" may also be printed on the lower surface 17 of the sheet of cellular material 16 or composite simulated creeper and oil or grease mat 25.

FIG. 6 shows an assembly 31 of combined simulated creepers 25 for mechanics 10 servicing a vehicle 12 spaced from a floor 13 and mat for catching vehicle drippings 14 from vehicles, such as shown at 12 and 120, for instance. That assembly includes a display box 32 and sheets of cellular material in that box each having the lower floor-contacting surface 17 and having a parallel upper surface 18 and a drip-impervious layer 19 having a lower surface friction than the sheets at their lower surface 17, such as described above in connection with FIG. 2, for instance.

Each sheet of composite creeper and mat 25 may have the folding score line 28 thereacross and may be folded in the display box 32 across that folding score line.

Each sheet may have the marginal score lines 27 shown in FIGS. 1 and 5, for instance, and/or text may be printed on the upper sheet surface 20, for instance.

The layer 19 on each sheet may be a metal foil covering that sheet at the upper surface or another material having the above mentioned lower surface friction.

The display box 32 may have a cut-off portion 34 leaving part of the composite sheets 25 exposed frontally and laterally, and a box top 35 closing that cut-off portion, such as during storage and shipping.

The subject extensive disclosure will render apparent or suggest to those skilled in the art various modifications and variations within the spirit and scope of the subject invention and equivalents thereof.

I claim:

1. A combined simulated creeper and mat for mechanics servicing a vehicle spaced from a floor and for catching vehicle drippings, comprising in combination with said vehicle and said floor:

a sheet of cellular material having a lower surface contacting said floor and having an upper surface parallel to said lower surface; and on said upper surface a drip-impervious layer facing said vehicle and having a lower surface friction than said sheet at said lower surface.

2. A combined simulated creeper and mat as in claim 1, wherein:

said sheet has marginal score lines.

3. A combined simulated creeper and mat as in claim 2, including:

text printed on said upper surface.

4. A combined simulated creeper and mat as in claim 1, wherein:

said sheet has a folding score line thereacross.

5. A combined simulated creeper and mat as in claim 4, wherein:

said sheet has marginal score lines.

6. A combined simulated creeper and mat as in claim 5, including:

text printed on said upper surface.

7. A combined simulated creeper and mat as in claim 4, including:

text printed on said upper surface.

8. A combined simulated creeper and mat as in claim 1, including:

text printed on said upper surface.

9. A combined simulated creeper and mat for mechanics servicing a vehicle spaced from a floor and for catching vehicle drippings, comprising in combination with said vehicle and said floor:

a sheet of cellular material having a lower surface contacting said floor and having an upper surface parallel to said lower surface; and on said upper surface a metal foil covering said sheet at said upper surface and facing said vehicle and having a lower surface friction than said sheet at said lower surface.

10. A combined simulated creeper and mat as in claim 9, wherein:

said sheet has marginal score lines.

11. A combined simulated creeper and mat as in claim 10, including:

text printed on said upper surface.

12. A combined simulated creeper and mat as in claim 10, wherein:

said sheet of cellular material is a sheet of corrugated material.

13. A combined simulated creeper and mat as in claim 9, wherein:

said sheet has a folding score line thereacross.

14. A combined simulated creeper and mat as in claim 13, including:

text printed on said upper surface.

15. A combined simulated creeper and mat as in claim 13, wherein:

said sheet of cellular material is a sheet of corrugated material.

16. A combined simulated creeper and mat as in claim 13, wherein:

said sheet has marginal score lines.

17. A combined simulated creeper and mat as in claim 16, including:

text printed on said upper surface.

18. A combined simulated creeper and mat as in claim 16, wherein:

said sheet of cellular material is a sheet of corrugated material.

19. A combined simulated creeper and mat as in claim 9, including:

text printed on said upper surface.

20. A combined simulated creeper and mat as in claim 19, wherein:
   said sheet of cellular material is a sheet of corrugated material.

21. A combined simulated creeper and mat as in claim 9, wherein:
   said sheet of cellular material is a sheet of corrugated material.

22. A combined simulated creeper and mat for mechanics servicing a vehicle spaced from a floor and for catching vehicle drippings, comprising in combination with said vehicle and said floor:
   a sheet of corrugated material having a lower surface contacting said floor and having an upper surface parallel to said lower surface; and
   on said upper surface a drip-impervious layer facing said vehicle and having a lower surface friction than said sheet at said lower surface.

23. A combined simulated creeper and mat as in claim 22, including:
   text printed on said upper surface.

24. A combined simulated creeper and mat as in claim 22, wherein:
   said sheet has marginal score lines.

25. A combined simulated creeper and mat as in claim 24, including:
   text printed on said upper surface.

26. A combined simulated creeper and mat as in claim 24, wherein:
   said sheet has a folding score line thereacross.

27. A combined simulated creeper and mat as in claim 26, including:
   text printed on said upper surface.

28. A combined simulated creeper and mat as in claim 26, wherein:
   said sheet has marginal score lines.

29. A combined simulated creeper and mat as in claim 28, including:
   text printed on said upper surface.

* * * * *